(12) United States Patent
Morgan et al.

(10) Patent No.: US 11,906,881 B2
(45) Date of Patent: Feb. 20, 2024

(54) MEDICAL MATTRESS FAILURE DETECTION DEVICE

(71) Applicant: Direct Supply, Inc., Milwaukee, WI (US)

(72) Inventors: Justin T. Morgan, Cedarburg, WI (US); David Gorodetsky, Milwaukee, WI (US)

(73) Assignee: Direct Supply, Inc., Milwaukee, WI (US)

( * ) Notice: Subject to any disclaimer, the term of this patent is extended or adjusted under 35 U.S.C. 154(b) by 84 days.

(21) Appl. No.: 17/540,635

(22) Filed: Dec. 2, 2021

(65) Prior Publication Data

US 2022/0175599 A1 Jun. 9, 2022

Related U.S. Application Data

(60) Provisional application No. 63/121,059, filed on Dec. 3, 2020.

(51) Int. Cl.
| | |
|---|---|
| *G01G 23/36* | (2006.01) |
| *G03B 17/55* | (2021.01) |
| *G03B 17/18* | (2021.01) |
| *A61G 7/05* | (2006.01) |
| *G01G 19/52* | (2006.01) |
| *G01G 19/62* | (2006.01) |
| *G08B 21/18* | (2006.01) |

(52) U.S. Cl.
CPC .............. *G03B 17/55* (2013.01); *A61G 7/05* (2013.01); *G01G 19/52* (2013.01); *G01G 19/62* (2013.01); *G01G 23/362* (2013.01); *G03B 17/18* (2013.01); *G08B 21/182* (2013.01); *A61G 2203/20* (2013.01); *A61G 2203/30* (2013.01)

(58) Field of Classification Search
CPC .. A61G 7/05; A61G 2203/20; A61G 2203/30; G01G 19/52; G01G 19/62; G01G 23/362; G08B 21/182
See application file for complete search history.

(56) References Cited

U.S. PATENT DOCUMENTS

| | | | |
|---|---|---|---|
| 3,846,857 | A | 11/1974 | Weinstock |
| 4,827,763 | A | 5/1989 | Bourland et al. |
| 4,833,457 | A | 5/1989 | Graebe, Jr. |
| 5,010,772 | A | 4/1991 | Bourland et al. |
| 5,808,552 | A | 9/1998 | Wiley et al. |
| 6,165,142 | A | 12/2000 | Bar |

(Continued)

FOREIGN PATENT DOCUMENTS

| | | |
|---|---|---|
| JP | 2009525133 A | 7/2009 |
| WO | 9963314 A1 | 12/1999 |
| WO | WO 2019107661 * 6/2019 ............. G16H 20/30 |

*Primary Examiner* — Hongmin Fan
(74) *Attorney, Agent, or Firm* — Boyle Fredrickson, S.C.

(57) ABSTRACT

A system for signaling an overload of a foam mattress, including a foam mattress having a plurality of conductive inserts located near a bottom surface and a contact pad positioned below the bottom surface of the mattress. The system may generate an overload alarm signal as a function of receiving one or more signal outputs from the sensor over a period of time. The system may also generate an overload alarm signal as a function of receiving a plurality of individual signal outputs from a plurality of one or more conductive inserts located within a predetermined area of the sensor.

22 Claims, 5 Drawing Sheets

(56) References Cited

U.S. PATENT DOCUMENTS

| | | | |
|---|---|---|---|
| 6,244,272 B1 | 6/2001 | Montant et al. | |
| 6,943,694 B1 | 9/2005 | Ellis | |
| 7,414,536 B2 | 8/2008 | Call et al. | |
| 8,671,782 B2 | 3/2014 | Mink | |
| D745,831 S | 12/2015 | Hopp et al. | |
| 2001/0039681 A1 | 11/2001 | Johnson et al. | |
| 2003/0221261 A1 | 12/2003 | Torbet et al. | |
| 2006/0064820 A1 | 3/2006 | Call et al. | |
| 2006/0244466 A1 | 11/2006 | Call et al. | |
| 2006/0278005 A1 | 12/2006 | Broden et al. | |
| 2007/0056101 A1 | 3/2007 | Mahajan et al. | |
| 2007/0285269 A1* | 12/2007 | Geay | A61G 7/05769 340/686.1 |
| 2009/0013802 A1 | 1/2009 | Orlewski et al. | |
| 2009/0093990 A1 | 4/2009 | McGuire et al. | |
| 2009/0229381 A1 | 9/2009 | Fujimoto et al. | |
| 2010/0282000 A1 | 11/2010 | Gorjanc et al. | |
| 2011/0068928 A1 | 3/2011 | Riley et al. | |
| 2011/0218684 A1 | 9/2011 | Genaro | |
| 2011/0263950 A1 | 10/2011 | Larson et al. | |
| 2012/0053424 A1 | 3/2012 | Kenalty et al. | |
| 2012/0277637 A1 | 11/2012 | Vahdatpour et al. | |
| 2013/0091961 A1 | 4/2013 | Taylor | |
| 2013/0125409 A1 | 5/2013 | Conigliaro | |
| 2013/0317393 A1 | 11/2013 | Weiss et al. | |
| 2014/0059781 A1 | 3/2014 | Lafleche et al. | |
| 2015/0173667 A1 | 6/2015 | Ben Shalom et al. | |
| 2017/0027792 A1 | 2/2017 | Lafleche et al. | |
| 2017/0184390 A1 | 6/2017 | Fukuda et al. | |
| 2017/0332803 A1 | 11/2017 | Jacobs et al. | |
| 2021/0353478 A1* | 11/2021 | Heneveld, Jr. | G05B 15/02 |
| 2022/0322971 A1* | 10/2022 | Meddings | A61B 5/1115 |

* cited by examiner

MEDICAL MATTRESS FAILURE DETECTION DEVICE

CROSS REFERENCE TO RELATED APPLICATION

This application claims priority to U.S. Provisional Patent Application Ser. No. 63/121,053 filed on Dec. 3, 2020, the entirety of which is incorporated herein by reference.

BACKGROUND OF THE INVENTION

The present invention relates to devices for mattress failure, and in particular to a mattress providing for an alert in the occurrence of a failure.

Mattresses intended for hospitals or long-term care may provide for one or more pressure redistribution layers, often formed of foam, intended to help reduce regions of pressure that may lead to pressure injuries. As a result of repetitive use, the ability of the layers to support a user may deteriorate over time. Such decline in the performance of the layers can result in excessive compression of the layers and cause an increase in the occurrence of undesirable pressure points experienced by the user. Alternatively, the mattress prescription may be incorrect, for example assigning a relatively "softer" mattress to a heavier patient. If unnoticed or unaddressed, repeated exposure to mattress pressure points may result in the formation of pressure injuries, i.e., bedsores. In the absence of mattress performance decline, similar pressure points may also occur in users such as bariatric patients that exceed the prescribed weight range for a particular mattress.

One method of detecting wear in a mattress is by a care giver manually depressing the top of mattress downwardly to qualitatively gauge its approximate support capability. Such a method is inherently inconsistent and cannot be effectively administered while a user is laying on the mattress. Accordingly, in practice mattress failure, either as a result of deterioration or improper prescription, may often be detected by the user indicating the lack of support provided by the underperforming mattress.

Accordingly, a system for the detection of mattress overload, either by foam deterioration, improper mattress prescription or other cause, is desired.

SUMMARY OF THE INVENTION

In one embodiment, the present invention provides mattress overload detection system comprising a mattress body and a sensor. The mattress body is comprised of one or more polymer foam layers and includes a top supporting surface sized and adapted to receive and support a supine individual when the surface is upwardly facing, and an opposing bottom surface. The sensor is disposed at the bottom surface of the mattress body and includes an array of conductive inserts and a contact pad. The array of conductive inserts is recessed in the mattress body inwardly of the bottom surface while a contact pad is located at the bottom surface of the mattress body, each conductive insert defining electrical switch, wherein the sensor is configured to generate a signal output when the one or more polymer foam layers has exceeded a compression threshold defined by one or more of the conductive inserts traveling into electrical communication with the contact pad to activate the corresponding switch It is thus a feature of at least one embodiment of the invention to provide a sensor that can assess mattress overload (either from weight or degradation of mattress material) on an automatic basis using the weight of a supine patient. By employing sensors that extend into the mattress body, mattress compression can be assessed. The inventors have determined that mattress overload can be detected from the bottom side of the mattress despite the intervening cushioning layers of the mattress itself, allowing convenient placement of the sensor system below the mattress.

The sensor may further include a processor configured to receive the one or more signal outputs indicative of the conductive inserts traveling into electrical communication with the contact pad, i.e., closing of the switch, and generate a mattress overload alarm signal therefrom.

It is thus a feature of at least one embodiment of the invention to allow sophisticated interpretation of the sensor signals according to a variety of different metrics through the use of a programmable processor.

The processor may generate the mattress overload alarm signal only if a predetermined number of switches is activated.

It is thus a feature of at least one embodiment of the invention to distinguish mattress overload from localize pressure for example of an individual sitting on the side of the bed.

In addition, the processor may generate the mattress overload alarm signal only if the predetermined number of switches is activated for a predetermined time.

It is thus a feature of at least one embodiment of the invention to eliminate false overload signals that may occur through dynamic rather than static loading as a patient shifts his or her position on the mattress.

The processor may group the switches according to zones being less than all of the switches on the mattress and separately determines a signal output for each zone.

It is thus a feature of at least one embodiment of the invention to allow discrimination of overload between different portions of the mattress and implement sophisticated overload detection strategies that use separate readings from each zone to determine for example whether the individual is supine or sitting up.

The conductive inserts are uniformly distributed within each zone.

It is thus a feature of at least one embodiment of the invention to provide control of the distribution of the conductive inserts either by uniformly distributing them for simplicity and manufacture or distributing them at different densities according to the information conveyed, for example increasing the density toward the center of the mattress in the hip area or other region that may be susceptible to early mattress breakdown.

The conductive inserts may be an elastomer.

It is thus a feature of at least one embodiment of the invention to provide conductive inserts that do not unfavorably affect the overall elasticity of the mattress.

The mattress body maybe releasably attached to the contact pad.

It is thus a feature of at least one embodiment of the invention to allow the production of a low-cost mattress sensor assembly where the sensor assembly can be reused.

In addition, the mattress system may include a display device adapted to be positioned remote from the mattress and wherein the processor is configured to transmit the mattress overload alarm signal to a display device.

It is thus a feature of at least one embodiment of the invention to allow a third party to remotely monitor the occurrence of mattress overload alarm signals, for example at a nurses' station in a hospital or long-term care facility.

These and other features and aspects of the present invention will be better appreciated and understood when considered in conjunction with the following description and the accompanying drawings. It should be understood, however, that the following description, while indicating representative embodiments of the present invention, is given by way of illustration and not of limitation. Many changes and modifications may be made within the scope of the present invention without departing from the spirit thereof, and the invention includes all such modifications.

BRIEF DESCRIPTION OF THE DRAWINGS

A clear conception of the advantages and features constituting the present invention, and of the construction and operation of the present invention, will become more readily apparent by referring to the exemplary, and therefore non-limiting, embodiments illustrated in the drawings accompanying and forming a part of this specification, wherein like reference numerals designate the same elements in the several views, and in which.

DETAILED DESCRIPTION OF THE PREFERRED EMBODIMENT

Figure 1:
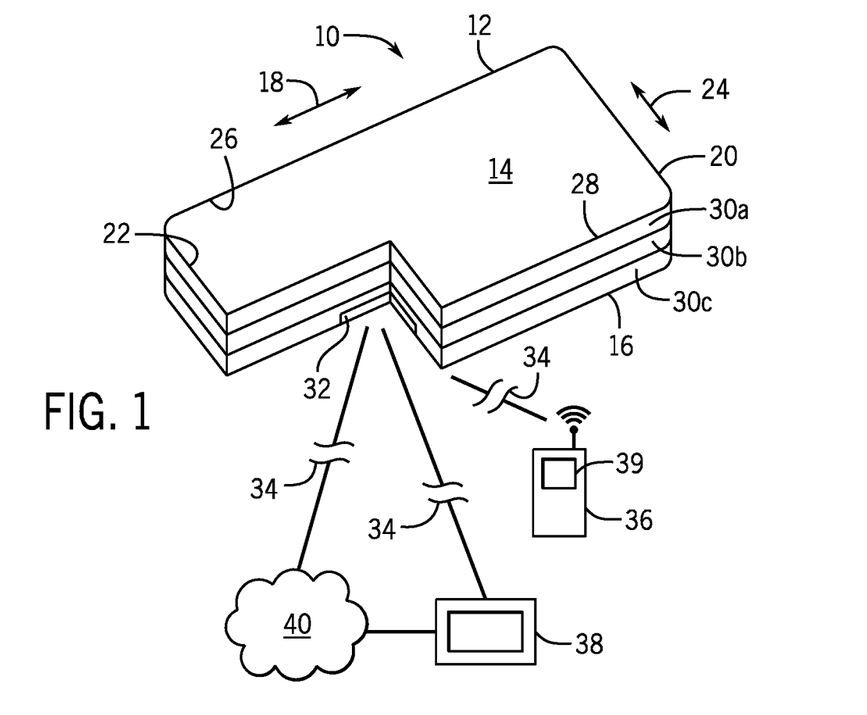
FIG. 1 is a simplified perspective view of a mattress overload detection system according to one embodiment of the present invention.

Referring initially to FIG. 1, the mattress overload detection system 10 according to one embodiment may include a mattress 12. The mattress 12 may present a rectangular cushion having opposed broad surfaces presenting a generally planar top surface 14 on a top side that is configured to receive and support the entire user's body for an average human in a supine or prone position while the user lies on the top surface 14, and a bottom surface 16 generally parallel to the top surface 14 that is configured to be received on a support 17, such as a bed frame, hospital bed or articulating carriage. The top surface 14 and bottom surface 16 may be separated by a mattress thickness, for example, of greater than five or greater than eight inches. Each of the top and bottom surfaces 14, 16 extends along the mattress length 18 from a head end 20 to a foot end 22, for example, at least, 76, 80, or 84 inches. Each of the top and bottom surfaces 14, 16 further extends along the mattress width 24 between left side 26 and right side 28, for example, for example by at least 35, 39 and 42 inches. It will be appreciated that a variety of other dimensions may also be employed.

Still referring to FIG. 1, the mattress 12 may be constructed from multiple parallel laminated layers 30 each of an elastomeric foam material such as polyurethane foam. The foam layers 30 will generally have a width substantially equal to the width of the mattress 12 and a thickness being a predetermined proportion of the thickness of the mattress 12 so that the sum of the thicknesses of the layers 30 times their thickness equals the thickness of the mattress 12. In one embodiment, as illustrated in FIG. 1, the layers 30 have a length approximately equal to the length 18 of the mattress 12, extending from the head end 20 to the foot end 22. Alternatively, in another embodiment not shown, all but the outermost of top most layer 30a may have a length slightly shorter than the length of the mattress 12 to extend from a head end 20 of the mattress 12 to a point just short of the foot end 22 of the mattress 12 where a patient's heels would rest. The bottom most foam layer 30c will, in contrast, extend the full length of the mattress 12. In such an embodiment, the portion of the mattress 12 that received a patient's heels may be formed of differing foam or foam thickness from that of layers 30b and/or 30c, for example, as taught in U.S. Pat. No. 9,877,591, assigned to the assignee of the present invention and hereby incorporated by reference.

In one embodiment, as shown in FIG. 1, layers 30a-30c will be provided assembled together by adhesive into a unitary mattress body. Specifically, layer 30a may be positioned proximate to the top surface 14 and layer 30c may be positioned proximate to the bottom surface 16, with layer 30b disposed between layers 30a and 30c. More specifically, layer 30a may have its inner broad surface attached to an upwardly facing or first broad surface of layer 30b with the downwardly facing or second broad surface of layer 30b attached to the inner broad surface of layer 30c. While the mattress 12 as illustrated in FIG. 1 includes three foam layers 30, it should be understood that the present invention is not so limited and that alternative numbers of layers 30, both greater and fewer, are well within the scope of the present invention.

Generally, the layers 30 of mattress 12 will each have a different firmness, for example, as designated by an indentation load deflection number (ILD) for example as measured by ASTM D3574 for a uniform volume of material (e.g., a 15' by 15' by 4' foam slab). Preferably, layer 30a is softer (lower ILD number) than layer 30b, and layer 30b will be softer than layer 30c. Accordingly, layer 30c, which defines the bottom surface 16 of the mattress 12, provides a relatively firm base. Layer 30a, which defines the top surface 14 of the mattress 12, provides a relatively soft top for receiving and supporting a patient. Layer 30b, which defines the middle layer of the mattress 12, provides an intermediate firmness that is softer than layer 30c and firmer than layer 30a. Positioning the layers 30 in progressive firmness's allows the top surface of the mattress 14 to provide adequate weight capacity and pressure redistribution when receiving a patient and can reduce "hammocking" that can occur when a firm layer is supported by a softer layer.

In one embodiment, the foam values for each layer can be as provided in the following table:

TABLE I

| Layer | Density (kg/m³) (+/−2 kg/m³) | ILD for standard test sample (lb) (+/−10%) | Thickness (inches) |
|---|---|---|---|
| 30a | 24 | 25-30 | 2.0 |
| 30b | 24 | 35-40 | 2.0 |
| 30c | 29 | 45-50 | 2.0 |

As a result of the relative densities (as indicated by the ILD values) and thicknesses of the layers 30, as represented above in Table 1, the mattress 12 described above and illustrated in FIG. 1 exhibits a volume weighted ILD value in a half of the mattress 12 closest to the top surface 14 being lower than volume weighted ILD value in a half of the mattress closest to the bottom surface 16. That is to say, that the total of the ILD values of each given layer 30 or portion thereof located in a first half of the mattress 12 nearest the top surface 14 times a thickness of the respective given layer or portion thereof located in the first half of the mattress is less than a total of the ILD values of each given layer 30 or portion thereof located in a second half of the mattress 12 nearest the bottom surface 16 times a thickness of the respective given layer or portion thereof located in the second half of the mattress 12. More specifically, the mattress 12 as described in Table 1 above exhibits a volume weighted ILD value of 92.0 in the half of the mattress 12 closest to the top surface 14 and a volume weighted ILD value of 138 in the half of the mattress 12 closest to the bottom surface 16. Accordingly, while FIG. 1 illustrates a three-layer foam mattress 12, any foam or similar mattress 12 that exhibits a similar relative volume weighted ILD of a second half nearest the bottom surface 16 being greater than the first half nearest the top surface 14 is considered within the scope of the present invention.

Still referring to FIG. 1, the mattress overload detection system 10 also includes an overload sensor 32 disposed at or within the bottom surface 16 of layer 30c of the mattress 12. The present inventors have determined that an overload detection system 10 at the bottom of the mattress can be used to detect mattress deterioration or miss-sizing of the mattress. Such an approach allows mattress assessment when the patient is on the mattress and moves the sensor system away from close contact with the patient.

Sensor 32 is configured to detect the occurrence of an overload event in the mattress 12, and trigger and output or alarm indicating the overload. As will be described in further detail below, an alarm signal 34 indicative of a mattress overload may be triggered by the sensor 32 and transmitted to either a wired or wireless output device. In the case of the wired device, the overload sensors 32 may provide conductors terminating in a releasable electrical connector that can be held in a pocket at or within the lower layer 30c and retrieved by a user reaching under the mattress to extend the connector and to connect a dedicated electrical readout display 36 (for example having a go-no go light or other gauge indicating mattress wear). Alternatively, the releasable electrical connector, i.e., port, that is configured to be connected to a releasable readout device may be embedded in a cover that surrounds the outer surface of the mattress body. The electrical readout display 36 may be connected and disconnected to the sensors 32 to make occasional sensor readings or may be left in a connected state, for example to act as a bedside monitor attached to the side of the bed or to the mattress for continuous reading. In the wireless embodiment, the display 36 may be a device such as a mobile phone, tablet or RFID tag reader, or dedicated low-energy Bluetooth communication device or the like, that is configured to display the overload status of the mattress 12. With a wireless device, a user, such a medical care provider, may walk through facility that includes multiple mattresses 12 within system 10, and verify the overload status of each mattress 12 in turn, or as the given mattress 12 come into wireless communication range of the handheld display 36. In this latter embodiment, alerts with respect to mattress failure may be provided episodically, for example, by text message or email message to caregiver remote devices such as mobile phones.

In each of these examples, the display 36 may act as a repeater 39 to send sensor data to a network system, such as an internet-based or cloud-based system 40 in which multiple mattresses 12 can transmit an indication of mattress overload to a common record keeping system or output device such a display device 38. In this case, a secondary display device 38 may be located within a nurse's station or other common area for simultaneously displaying the overload status of multiple mattresses 12 integrated into a common system 10. Such a system 10 may also provide for off-site monitoring and/or data storage. Each transmitter may provide a serial number to uniquely identify the mattress which serial number can be given a user assigned "friendly" name, for example, by means of a translation table contained in one of the displays 36.

Figure 2:
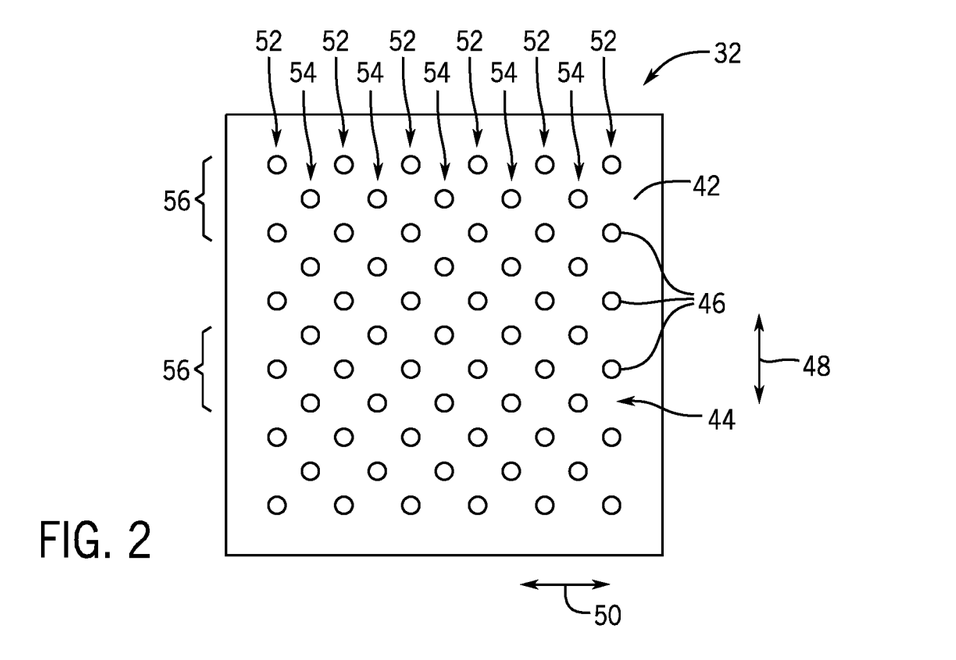
FIG. 2 is a top plan view of the sensor configured for use in the mattress overload detection system of FIG. 1.
Figure 3:
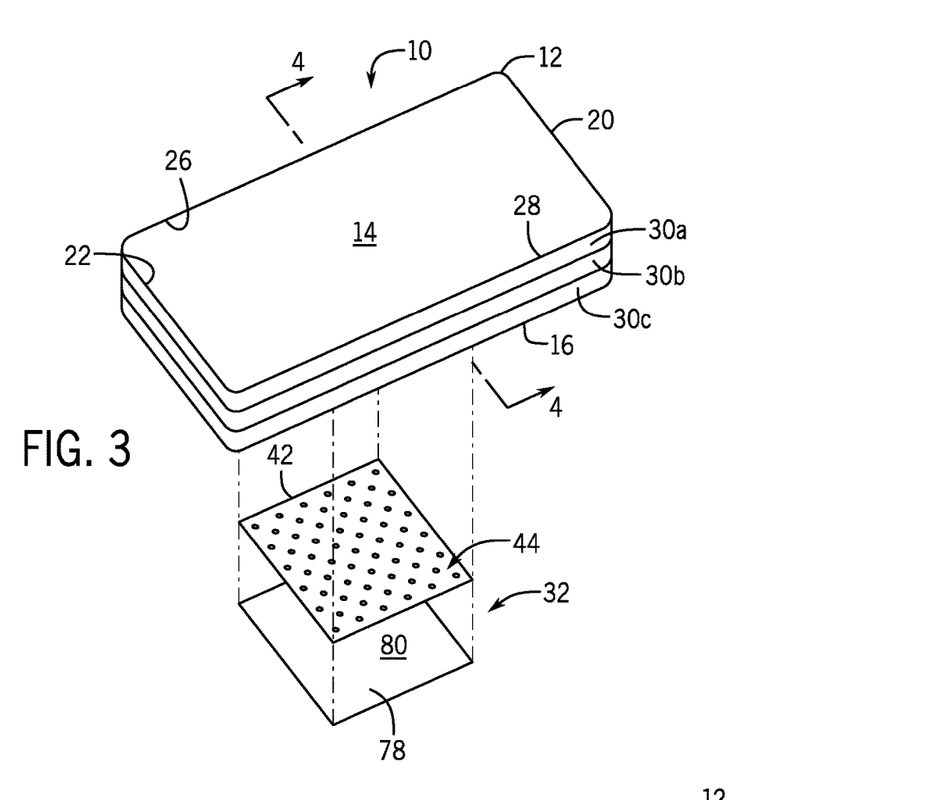
FIG. 3 partial exploded view of the sensor and mattress of the mattress overload detection system of FIG. 1.

Turning now to FIG. 2, the sensor 32 generally includes a flexible sensor membrane 42 (for example of silicone rubber) forming an array 44 of sensors, each sensor providing a conductive inserts 46 fitting within downwardly concave upwardly extending boss formed in the sensor membrane 42. The conductive inserts 46 are generally electrically conductive inserts formed of a metal, metal alloy, conductive elastomer or rubber, or conductive film or fabric, which are embedded into the pockets in the bosses of the flexible sensor membrane 42 at discrete locations as will be described below. The flexible sensor membrane 42, which may be formed of elastomeric material such as molded or vacuum formed silicon or similar flexible material, extends along a length 48 of approximately between ten (10) and thirty (30) inches and preferably approximately twenty (20) inches and width 50 of approximately between ten (10) and thirty (30) inches and preferably approximately twenty (20) inches and contains therein an array 44 of approximately between forty (40) and eighty (80) conductive inserts 46 and preferably approximately sixty-one (61) conductive inserts 46. In some embodiments, the flexible sensor membrane 42 serves primarily to provide environmental protection to the switch formed by the conductive insert 46 and the contact pad 78 (discussed below) and as such may provide substantially less resistance to compression (per area) than the material of the mattress surrounding the upward protrusions of the membrane 42 so that activation of the thus formed switch is primarily a function of compression of the mattress material not of the membrane 42. For this reason, the flexible sensor membrane 42 may be eliminated in favor of supporting the conductive insert 46 directly on the polyurethane material of the mattress itself.

As shown in FIG. 2, the array 44, in one embodiment, is latitudinally and longitudinally symmetrical in which six columns 52 containing six conductive inserts 46 and five columns 54 containing five conductive inserts 46 alternate along the length 48 and width 50 of the flexible sensor membrane 42. In this orientation, the conductive inserts 46 generally form a checkerboard pattern in which adjacent conductive inserts 46 of the same column 52, 54 are spaced apart a length 56 of approximately 3 inches, on-center, and adjacent alternating columns 52, 54 area spaced apart approximately 1.5 inches, on-center.

Figure 4:
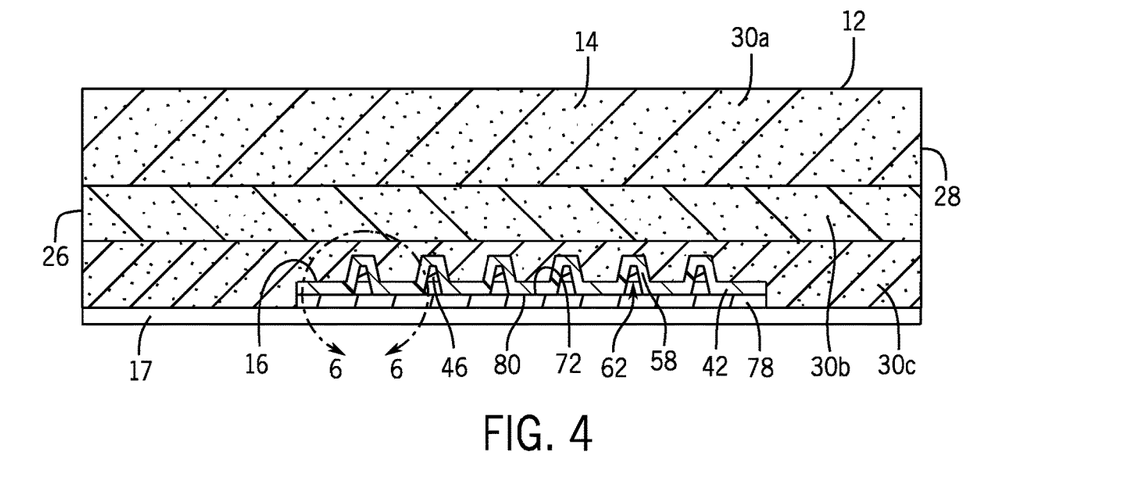
FIG. 4 is a cross-section taken along lines 4-4 of FIG. 3 showing multiple internal foam layers the sensor of the present invention in one embodiment.
Figure 5:
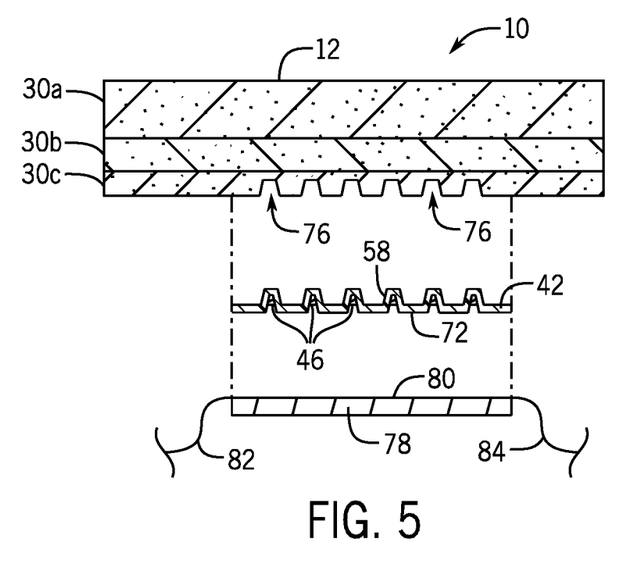
FIG. 5 is a partially exploded cross-section taken along lines 4-4 of FIG. 3 showing the bottom surface of the bottom of the mattress in further detail.
Figure 6:
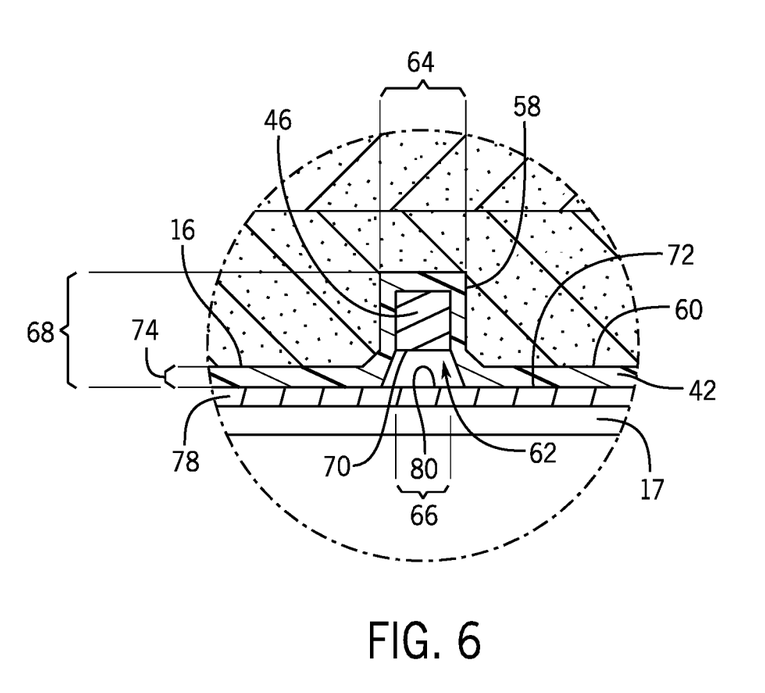
FIG. 6 is a partial detailed cross-section view of section 6 of FIG. 4 taken along lines 4-4 showing a portion of the sensor in detail.
Figure 7:
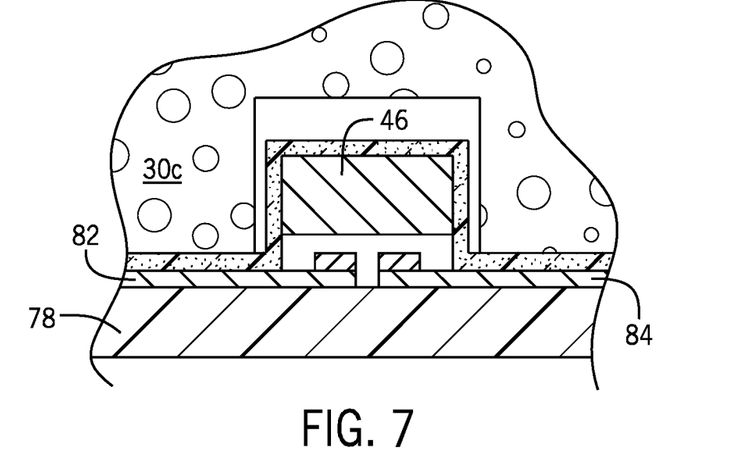
FIG. 7 is an partial detailed cross-section view of section 6 of FIG. 4 taken along lines 4-4 showing an alternative embodiment of portion of the sensor in detail.

Referring now to FIGS. 3-7, and specifically FIG. 6, the system 10 is shown in latitudinal cross-section. The mattress 12 includes three layers 30a, 30b, 30c, where the sensor 32 is disposed between the mattress 12 and more specifically the corresponding pockets of the bottom layer 30c and the support 17, i.e., bedframe. The cross-sectional view of the system 10 is taken through a column 52 of the array 44, in which six conductive inserts 46 are shown. In one embodiment, each of the conductive inserts 46 has a diameter of approximately 0.5 inches and a height of approximately 0.5 inches. The conductive inserts 46 are disposed within the flexible sensor membrane 42, where at the position of each conductive insert 46, an annular wall 58 extends upwardly from the top surface 60 of the flexible sensor membrane 42 to define a button retaining cavity 62. As such, each conductive insert 46 is disposed within its own insert retaining cavity 62. The outer diameter 64 of the annular wall 58 is approximately 1.0 inches and defines the button retaining cavity 62 that has an inner diameter 66 of approximately 0.5 inches, which forms a friction fit engagement with the conductive insert 46 retained therein. Alternatively, the each insert 46 may be molded directly into a corresponding cavity 62 during the formation of the flexible sensor membrane 42 or retained therein with an adhesive. In one embodiment, the cavity 62 has a depth 68 of approximately 0.6 to 0.7 inches such that when the conductive insert 46, having a height of approximately 0.5 inches, is fully seated in the cavity 62 the bottom surface 70 of the conductive insert 46 is recessed a distance or travel depth 74 approximately 0.1 to 0.2 inches from the bottom surface 72 of the flexible sensor membrane 42. That is to say that the bottom surface 70 of the conductive insert 46 would need to travel downward the travel depth 74 of approximately 0.1 to 0.2 inches in order to become coplanar with the bottom surface 72 of the flexible sensor membrane 42. This travel depth may be adjusted to control the sensitivity of the switch that is thus formed and the travel depth of different switches at different locations in the mattress may be changed so that variable sensitivities can be obtained in different areas.

Still referring to FIGS. 3-7, and specifically as illustrated in FIG. 5, a series of recesses 76 extend inwardly into the bottom layer 30c of the mattress 12 and upwardly from the bottom surface 16 thereof. The recesses 76 are sized and positioned to receive the raised annular walls 58 that surround each of the conductive inserts 46. For example, the recesses 76 may have a width approximately equal to the outer diameters 64 of the annular wall 58, and a depth of approximately 1.0 inches to accommodate the raised annular wall 58 therein. Accordingly, the flexible sensor membrane 42, with its array 44 of conductive inserts 46 is configured to be received at the bottom surface 16 without additional compression of the foam layers 30 due to the presence of the flexible sensor membrane 42. By way of a nonlimiting example, in one embodiment of the present invention the bottom layer 30c may have a thickness of 2.0 inches and a recess depth of 1.0 inches, such that 1.0 inches of the bottom layer 30c remains above each of the conductive inserts 46 in an uncompressed state when the sensor 32 is positioned under the mattress 12.

Still referring to FIGS. 3-7, and specifically FIG. 4, the sensor 32 further comprises a contact pad 78, such as a PCB, providing a relatively flexible or non-rigid substrate, for example, of flexible composite having an upper etched copper conductor (or other metal or conductive polymer) forming circuit wiring that will be described. The contact pad 78 is positioned below the flexible sensor membrane 42 beneath each conductive insert 46 so that pressing downward of the conductive insert 46 will short or interconnect two contact pads to provide electrical current through a pair of conductors associated with a given sensor. The contact pads may, for example, be gold-plated to reduce their resistance and provide improved immunity from oxidation. The contact pad 78 and each corresponding conductive insert 46 thus provide a switch providing a binary signal based on conduction. It will be appreciated that the invention may employ other mechanisms to generate a binary signal, for example, by sensing capacitive or inductive changes caused by approach of the conductive insert 46 to the conductive pads 78. In this regard each of these switches may also provide an analog signal indicating a degree of proximity to thus provide a non-binary signal.

In this regard, the top surface 80 of the contact pad 78 is configured to abut and support the bottom surface 72 of the flexible sensor membrane 42. In one embodiment, the conductors of the contact pad 78 provide a separate pair of wires dedicated to each sensor and each pair of contact pads.

When a conductive insert 46 within the array 44 is fully seated in its corresponding cavity 62 of the flexible sensor membrane 42, the bottom surface 70 of the conductive insert 46 is recessed a distance or travel depth 74 of approximately 0.1 to 0.2 inches from the top surface 80 of the contact pad 78, and its corresponding circuit located thereon. As shown in detail in FIG. 7, an overload compression of the mattress layers 30 at the location of a conductive insert 46 will force the bottom surface 70 of the conductive insert 46 into an electrical contact with the top surface 80 of the contact pad 78, thereby temporarily closing the discrete circuit corresponding to that given conductive insert 46. Still referring to FIG. 7, and more specifically, once the circuit is closed, an electrical current travels from a power source 86 though a first lead 82, which may be formed of a copper cladding overlying the printed circuit board substrate formed of a nonconductive fiberglass or epoxy that forms the contact pad 78. The electrical current then travels from the first lead 82 to an electrode such as a gold plate positioned below to the conductive insert 46, through the conductive insert 46 that is in electrical communication with the contact pad 78, via the electrode, when depressed, to a second lead 84, and its corresponding electrode. The second lead 84, which is similarly formed of a copper cladding on the PCB substrate carries a current from the corresponding position on the contact pad 78 that corresponds to the conductive insert position to a processor 88 as will be described below. In this manner, downward movement of the one or more conductive inserts 46 acts as a button or switch to temporarily signal mattress overload only while the layers 30 of the mattress 12 is compressed beyond a desired threshold. While the previously described embodiment of system 10 includes the use of conductive inserts 46 as binary switches, it should be understood that use of capacitive sensors, eddy current sensors and the like are well within the scope of the current invention.

Figure 8:
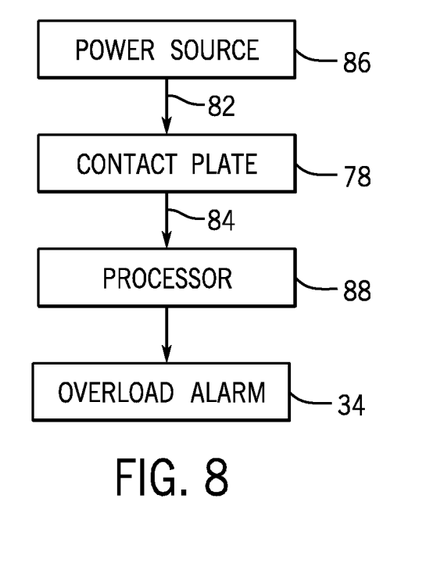
FIG. 8 is a flow chart showing the mattress overload detection system according to one embodiment of the present invention.

Turning now to the flow chart of FIG. 8, when system 10 is in use a power source 86 supplies an electrical current to the various discrete circuits contained on the contact pad 78 via discrete leads 82. The power source 86, such as a low voltage power supply, for example less than 12 V and ideally less than 5 V, may be supplied via an electrical outlet for fix-location installations of the system 10 or may alternatively be supplied by an electrical storage device such as a battery for use in mobile installations of the system 10. Upon the occurrence of an overload compression of the mattress layers 30, the bottom surface 70 of the one or more conductive inserts 46 in the array 44 move into an electrical contact with the top surface 80 of the contact pad 78, thereby closing one or more circuits and outputting an overload signal to the processor 88 via leads 84. Accordingly, in this embodiment, the flexible sensor membrane 42 and its array 44 of conductive inserts 46 are not directly supplied with an electrical current, but rather electrical current passes through the conductive inserts 46 only when the mattress 12 is in an overload state and the conductive inserts 46 are compressed the travel distance 74 into contact with the contact pad 78. The processor 88, for example a microcontroller, may include a multiplexer that is configured to select from the various inputs received from the closed circuits of the sensor 32, in the event of mattress overload, and transmit an overload signal alarm 34 indicative of mattress overload and encoding the position of the overload among the different sensors. It will be appreciated that the multiplexer may identify the particular contact pad 78 being activated and thus may provide a mapping of signals at two locations on the mattress that can be used to assess overload and/or to ignore false alarms. In that regard, the processor 88 may attach a different significance or weighting to different contact pads 78 in generating an overload signal. The signal alarm 34 may be a visual or audible indicator received at a handheld display 36, dedicated or network connected display device 38 or internet or cloud-based monitoring system 40 as described above. The signal alarm 34 may simply provide an indication of overload or may provide for a graphic representation of the locations of the overload based on the sensors being compressed.

The processor 88 may also generate the overload signal alarm 34 indicative of mattress overload as a function of the one or more signals received from the closed circuits of the sensor 32, in the event of mattress overload, as a function of time. In this regard, it is important to guard against a false-positive signal indicative of mattress overload. For example, if an individual is temporarily sitting on the mattress 12 while in the process of laying down or rising from a prone or supine laying position, then a larger percentage of the individual's mass may be temporarily located over the sensor 32, which may result in greater compression of the foam layers 30 localized in the area of the sensor 32 as to generate an overload signal from the sensor 32. Alternatively, a caregiver may temporarily add additional mass to the mattress 12, for example while rotating or assisting in the repositioning of a patient laying on the mattress 12, which may also result in greater compression of the foam layers 30 localized in the area of the sensor 32 as to generate an overload signal from the sensor 32. To minimize such temporary compression of the foam layers 30 localized in the area of the sensor 32 from generating a false-positive overload signal alarm 34, i.e., generating an alarm in the absence of genuine overload of the mattress layers 30, the processor may generate the overload signal alarm 34 indicative of mattress overload as a function of signals received from the closed circuits of the sensor 32 as a function of time. In one such embodiment, the processor 88 may include a required time threshold, such that one or more conductive inserts 46 in the array 44 must remain in an electrical contact with the top surface 80 of the contact pad 78, thereby closing one or more circuits and sending an overload signal to the processor 88 via leads 84 for a duration that exceeds a preset time threshold. In one embodiment the preset time threshold may be between approximately 3 to 30 seconds and more preferably between 5 and 15 seconds. In an alternative embodiment, generating an overload signal alarm 34 from the processor 88 may require that a number of conductive inserts 46 in the array 44 travel downward into electrical contact with the top surface 80 of the contact pad 78, thereby closing one or more circuits and sending a threshold number of overload signals to the processor 88 via leads 84 during a specified time frame. In one embodiment the threshold number of conductive inserts 46 contacting the contact pad 78 is preferably between approximately 5 and 45 during a period of 60 seconds, and more preferably between approximately 15 and 45 during a period of 60 seconds.

In yet another embodiment of the invention, generating the overload signal alarm 34 from the processor 88 may be a function the threshold number of conductive inserts 46 contacting the contact pad 78 simultaneously relative to a predefined surface area of the contact pad 46. By way of nonlimiting example, the threshold number of conductive inserts 46 contacting the contact pad 78 may be between approximately 60% and 100% and more preferably between approximately 80% and 100% of the conductive inserts 46% located within a given portion of the surface area of the contact pad. The given portion of the mattress may be flexibly defined, for example, to be a region around the patient's hips or shoulders or feet, for example, defined by a height range along the mattress less than 50% and normally less than 30% of the mattress height. Separate ranges may be used and each range may be independently assessed with respect to the percentage of conductive inserts 46 making contact and how long that contact is made so, for example, the overload region may be isolated to the particular portion. The ability to individually obtain signals from different portions of the mattress allows sophisticated extraction of overload signals, for example, that distinguish between whether the patient is supine (all zones indicating an overload) or sitting up (a central lateral zone indicating an overload) in which case an overload might be ignored.

Figure 9:
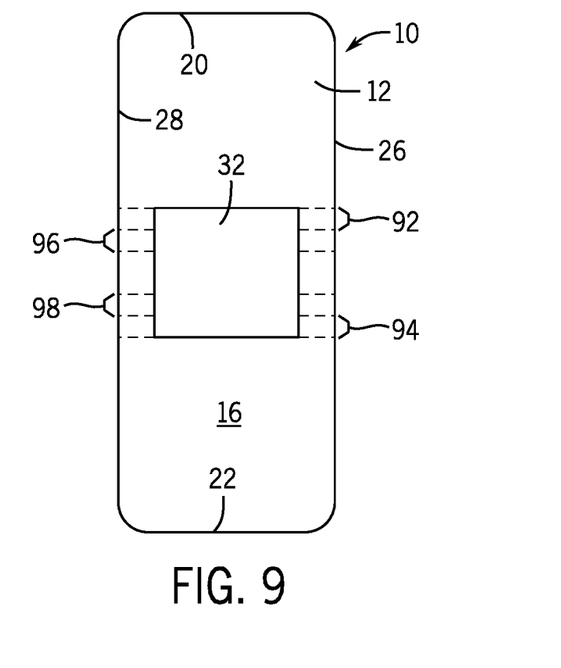
FIG. 9 is a bottom plan view of the mattress and the relative position of the sensor according to one embodiment of the present invention; and, FIGS. 10a and 10b are charts showing the distribution of force in a functioning and failings mattress under an application of localized weight, respectively.

Turning now to FIG. 9, the location of the sensor 32 over the area of the bottom surface 16 of the mattress 12 may be selected to ensure that the pelvic region of the user is properly aligned over the sensors 32 when laying on mattress 12 and may generally match the portions described above. Accordingly, either the location of the sensor 32 may be selected based on ranges 92, 94, 96, 98 as described below to optimize position for average users, the position of the sensor may be customized for a specific user's height, or the area covered by the sensors 32 (for example by increasing sensor number or spacing) may be increased to provide greater coverage and account for greater variability of pelvic positioning on the mattress 12. Thus the spacing and density of the sensors 32 may vary over the area of the mattress. For the average older female adult user on a mattress 12 having a length 18 of approximately 76 inches, the mean location of the top of the pelvis is in range 92 from approximately 29 inches to 34.5 inches from the head end 20 of the mattress, and a 5% standard deviation in the location of the top of the pelvis is in range 96 from approximately 34.5 inches to 37 inches from the head end 20 of the mattress. Still referring to the average older female adult user on a mattress 12 having a length 18 of approximately 76 inches, the mean location of the bottom of the pelvis is in range 98 from approximately 42 inches to 46.5 inches from the head end 20 of the mattress, and a 5% standard deviation in the location of the bottom of the pelvis is in range 94 from approximately 46.5 inches to 49 inches from the head end 20 of the mattress. Referring now to the average older male adult user on a mattress 12 having a length 18 of approximately 76 inches, the mean location of the top of the pelvis is in range 96 from approximately 34.5 inches to 37 inches from the head end 20 of the mattress, and a 5% standard deviation in the location of the top of the pelvis is in range 92 from approximately 29 inches to 34.5 inches from the head end 20 of the mattress 12. Still referring to the average older male adult user on a mattress 12 having a length 18 of approximately 76 inches, the mean location of the bottom of the pelvis is in range 94 from approximately 46.5 inches to 49 inches from the head end 20 of the mattress 12, and a 5% standard deviation in the location of the bottom of the pelvis is in range 98 from approximately 42 inches to 46.5 inches from the head end 20 of the mattress. However, it should be understood that these measurements are provided by way of nonlimiting examples of older adult males and females using a mattress 12 having a length 18 of approximately 76 inches, and that variations in mattress length 18 and user height and proportion may be considered well within the scope of the present invention. Moreover, it should also be considered well within the scope of the present invention that the sensor 32 may be located on support 17, such as a hospital bed with an articulating carriage, such that articulation or flexing of the mattress 12 about one or more latitudinal axis is neither impeded by the position of the sensor 32 nor is the sensor 32 damaged during articulation, for example, raising the head of the mattress 12 or lowering the foot of the mattress 12. For this purpose, sensors 32 may be removed from the latitudinal axes along which the mattress flexes and positioned above hinge joints in the carriage. Likewise, the underlying pad may be hinged at these axes.

Figure 10A:
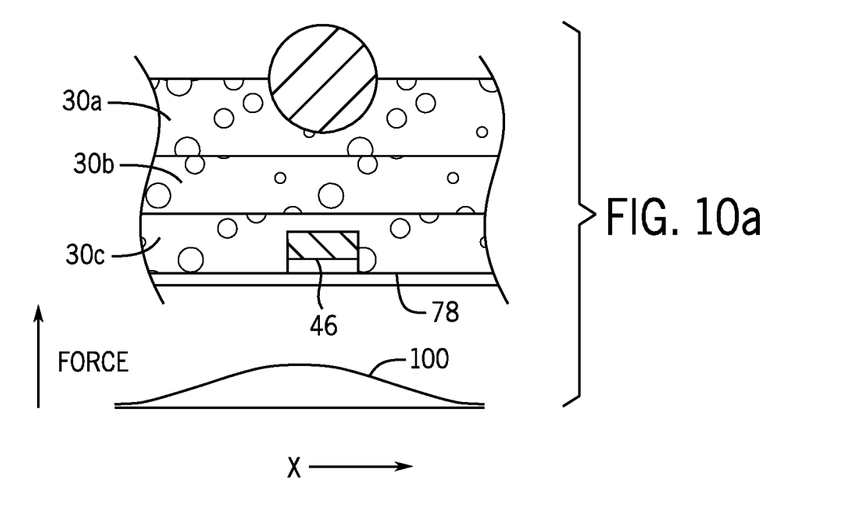
Figure 10B:
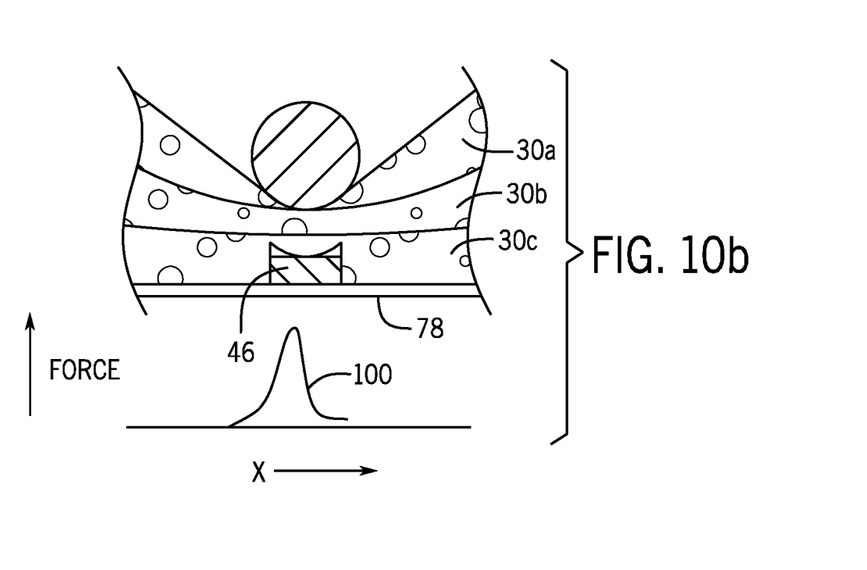

Referring now to FIGS. 10a and 10b, the present inventors have recognized that an overloading of a mattress, for example a new mattress with a patient who is overly heavy for that mattress, will naturally provide an increased compression of all layers 30a, 30b, 30c and thus can be detected from the underside of the mattress (as opposed to pressing down on the top of the mattress) simply by detecting that correspondingly increased compression of layer 30c. Similarly, when the elasticity of each of the layers has been equally degraded, so that their effective spring constant decreases, the layers 30 will each experience an increased compression for a given weight of a patient whose weight has not changed and again this degradation can be detected by monitoring only the bottom layer of the mattress which serves as a proxy for the other layers.

The present invention also allows detection of the degradation of the softer layers of the mattress and (30a and 30b) without a corresponding degradation of the lowest most layer 30d. This situation may arise because of the additional flexure that the upper layers are exposed to. In this case, degradation of the upper layers (not necessarily producing a corresponding degradation in the lowest layer 30c) is nevertheless believed to be detectable because of a change in the pressure distribution caused by the decreased support of the upper layers 30a and 30b causing a "focusing" or concentration of force on a smaller area around the sensor that may thus be detected as shown in FIG. 10b. Thus, the present invention can detect a differential degradation in the different foam layers.

It should be understood that the present system 10 is well suited for use with a variety of foam mattresses 12 and is configured to generate a signal 34 indicative of mattress overload independent of the mattress construction, i.e., layer combinations, core additives, bolster accessories, etc. For example, a mattress 12 having layers 30a, 30b, and 30c as described above may exhibit non-uniform layer compression when in use. More specifically, top layer 30a may initially exhibit greater compression then middle layer 30b, which has a relatively higher ILD value than top layer 30a. Simultaneously, bottom layer 30c may exhibit the least relative amount of compression, having the greatest ILD value. However, upon approximately full compression of the top layer 30a, the relative compression rate of middle layer 30b may increase. Similarly, the bottom layer 30c may exhibit its greatest relative rate of compression once both the top layer 30a and middle layer 30b have been approximately fully compressed. The sensor 32 of system 10 may be unaffected by the variable rate of compression exhibited in the layers 30a, 30b, 30c until the point where compression of the bottom layer 30c forces the bottom surface 70 of the conductive insert 46 towards contract with the top surface 80 of the contact pad 78. However, it should be understood that while the conductive insert 46 may travel marginally toward the top surface 80 of the contact pad 78 while the softest layers 30 of the mattress 12 are compressing, the greatest movement of the conductive insert 46 may occur are the bottom most layer and/or firmest layer compresses.

While the system 10 described above generally contemplates a mattress 12 in which a sensor 32 has been integrated, it should be understood that the present invention is not so limited. That is to say that system 10 of the present invention also includes a discrete sensor 32 that may be used with one or more mattresses 12. Accordingly, the mattress 12 may be provided independently of the sensor 32 and subsequently assembled together to form system 10 via a kit of discrete components. In such an embodiment, the bottom surface 16 of the mattress 12 may come preformed with recesses 76 for receiving the upwardly protruding annular ridges 58 associated with the conductive inserts 46 in the flexible sensor membrane 42. Upon assembly an individual may insert the flexible sensor membrane 42 into the bottom of the mattress 12. Accordingly, in such an embodiment the flexible sensor membrane 42 and contact pad 78 of the sensor 32 may be reused with various mattresses 12. Alternatively, the mattress 12 may be manufactured with an integrated retaining bord 42 and be configured for use with a reusable contact pad 78 upon installation. Importantly, the contact pad 78 may be separable from the mattress to allow reuse of the contact pad 78 with different mattresses. In this regard the components of the mattress are designed to represent a low part of the cost of the sensor system requiring only recesses to be cut in the mattress material and, in some cases, the insertion of conductive inserts.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications are hereby incorporated herein by reference in their entireties.

We claim:

1. A mattress overload detection system comprising:
a mattress body having a top supporting surface sized and adapted to receive and support a supine individual when the surface is upwardly facing, and an opposing bottom surface, the mattress body comprising one or more polymer foam layers;
a sensor disposed at the bottom surface of the mattress body comprising an array of conductive inserts each affixed to a bottom surface of a flexible retaining membrane and a contact pad disposed at the bottom surface of the mattress body, each conductive insert defining an electrical switch, wherein the sensor is configured to generate a signal output when the one or more polymer foam layers has exceeded a compression threshold defined by one or more of the conductive inserts traveling into electrical communication with the contact pad to activate the corresponding switch.

2. The mattress system of claim 1 wherein the sensor further comprises a processor configured to receive the signal output indicative of activation of the switches to generate a mattress overload alarm signal therefrom.

3. A mattress overload detection system comprising:
a mattress body having a top supporting surface sized and adapted to receive and support a supine individual when the surface is upwardly facing, and an opposing bottom surface, the mattress body comprising one or more polymer foam layers;
a sensor disposed at the bottom surface of the mattress body comprising an array of conductive inserts recessed in the mattress body inwardly of the bottom surface and a contact pad disposed at the bottom surface of the mattress body, each conductive insert defining an electrical switch, wherein the sensor is configured to generate a signal output when the one or more polymer foam layers has exceeded a compression threshold defined by one or more of the conductive inserts traveling into electrical communication with the contact pad to activate the corresponding switch;
wherein the sensor further comprises a processor configured to receive the signal output indicative of activation of the switches to generate a mattress overload alarm signal therefrom; and,
wherein the processor generates the mattress overload alarm signal only if a predetermined number of switches is activated.

4. The mattress system of claim 3 where-in the processor generates the mattress overload alarm signal only if the predetermined number of switches is activated for a predetermined time.

5. The mattress system of claim 2 where-in the processor groups the switches according to zones being less than all of the switches on the mattress and separately determines a signal output for each zone.

6. The mattress system of claim 5 wherein at least one zone is a subset of an area of the mattress located in a hip region of a predetermined supine individual.

7. The mattress system of claim 6 wherein the conductive inserts are uniformly distributed within each zone.

8. The mattress system of claim 1 wherein the conductive inserts are an elastomer.

9. The mattress system of claim 1 wherein the mattress body is releasably attached to the contact pad.

10. The mattress system of claim 2 further including a display device adapted to be positioned remote from the mattress and wherein the processor is configured to transmit the mattress overload alarm signal to the display device.

11. The mattress system of claim 1 wherein the array of conductive inserts each affixed to the bottom surface of a flexible retaining membrane further comprises each conductive insert fitting within a downwardly concave upwardly extending boss formed in the flexible retaining membrane.

12. The mattress system of claim 8 wherein the array comprises at least 50 conductive inserts affixed to the bottom surface of the flexible retaining membrane having a surface area of at least 300 square inches.

13. The mattress system of claim 1 wherein an exposed bottom surface of the conductive inserts are positioned within the mattress body at a distance of at least 0.2 inches from the bottom surface of the mattress body.

14. A kit for detecting a mattress overload comprising:
a mattress body having a top supporting surface sized and adapted to receive and support a supine individual when the surface is upwardly facing, and an opposing bottom surface, the mattress body comprising one or more polymer foam layers;
a sensor configured to be disposed at the bottom surface of the mattress body comprising a flexible board having an array of conductive inserts each affixed to a bottom surface of a flexible retaining membrane defining switches, wherein the conductive inserts are configured to be received at the bottom surface of the mattress body, and a discrete contact pad configured to be disposed at the bottom surface of the mattress body, and wherein the sensor is configured to generate a signal output when the one or more polymer foam layers has exceeded a compression threshold defined by one or more of the conductive inserts traveling into electrical communication with the contact pad to active the corresponding switch.

15. The kit of claim 14 wherein the sensor further comprises a processor configured to receive the signal output indicative of activation of the switches to generate a mattress overload alarm signal therefrom.

16. The kit of claim 15 wherein the processor generates the mattress overload alarm signal only if a predetermined number of switches is activated.

17. The kit of claim 15 wherein the processor generates the mattress overload alarm signal only if the predetermined number of switches is activated for a predetermined time.

18. The kit of claim 15 further including a display device adapted to be positioned remote from the mattress and wherein the processor is configured to transmit the mattress overload alarm signal to the display device.

19. A sensor system for detecting a mattress overload comprising:

an array of conductive inserts each affixed to a bottom surface of a flexible retaining membrane, wherein the conductive inserts are configured to be received at a bottom surface of a mattress;

a contact pad configured to be disposed at the bottom surface of the mattress, wherein the sensor generates a signal output when one or more polymer foam layers within the mattress has exceeded a compression threshold defined by one or more of the conductive inserts traveling into electrical communication with the contact pad while supporting a supine individual on the mattress;

a processor configured to receive the one or more signal outputs and transmit therefrom a mattress overload alarm signal as a function of time to a display device.

20. The sensor system of claim 19 wherein the sensor further comprises a processor configured to receive the signal output indicative of activation of the switches to generate a mattress overload alarm signal therefrom.

21. A sensor system for detecting a mattress overload comprising:

a flexible membrane having an array of conductive inserts retained therein, wherein the conductive inserts are configured to be received within a plurality of recesses in a bottom surface of a mattress;

a contact pad configured to be disposed at the bottom surface of the mattress, wherein the sensor generates a signal output when one or more polymer foam layers within the mattress has exceeded a compression threshold defined by one or more of the conductive inserts traveling into electrical communication with the contact pad while supporting a supine individual on the mattress;

a processor configured to receive the one or more signal outputs and transmit therefrom a mattress overload alarm signal as a function of time to a display device;

wherein the sensor further comprises a processor configured to receive the signal output indicative of activation of the switches to generate a mattress overload alarm signal therefrom; and, wherein the processor generates the mattress overload alarm signal only if a predetermined number of switches is activated.

22. The sensor system of claim 20 wherein the processor generates the mattress overload alarm signal only if the predetermined number of switches is activated for a predetermined time.

* * * * *